April 14, 1970  A. W. BISHOP ET AL  3,505,860
GEOLOGICAL SAMPLE TESTING APPARATUS
Filed Oct. 20, 1967
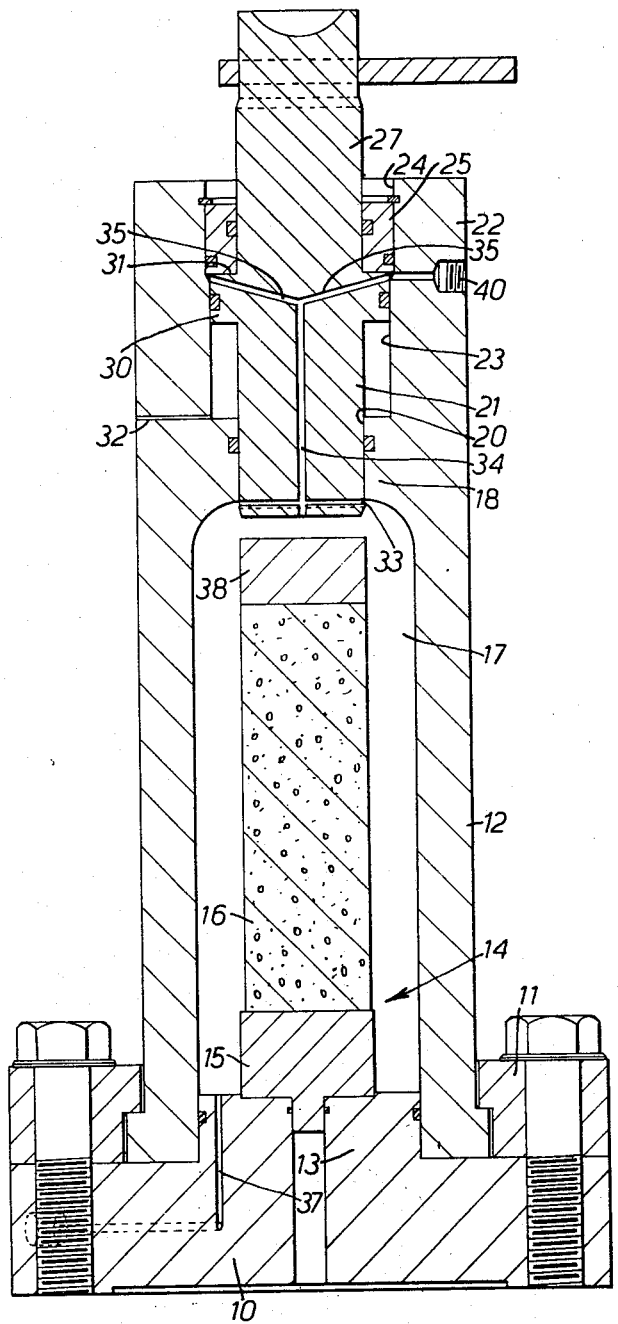
INVENTOR
ALAN W. BISHOP
ANGUS E. SKINNER
BY
Watson, Cole, Grindle + Watson
ATTORNEY United States Patent Office 3,505,860
Patented Apr. 14, 1970

3,505,860
GEOLOGICAL SAMPLE TESTING APPARATUS
Alan W. Bishop and Angus E. Skinner, London, England, assignors to Wykeham Farrance Engineering Limited
Filed Oct. 20, 1967, Ser. No. 676,948
Claims priority, application Great Britain, Oct. 28, 1966, 48,380/66
Int. Cl. G01n *3/00, 3/08*
U.S. Cl. 73—94
4 Claims

ABSTRACT OF THE DISCLOSURE

A geological sample testing cell having a chamber within which a sample way be placed between a ram and a platten leaving a space around the sample into which hydraulic fluid may be introduced to apply pressure to the sample, the ram affording a piston surface within a cylinder substantially equal in area to the area of the ram and arranged to act in the same direction as the ram, the cylinder being in communication with the space containing the hydraulic fluid.

---

Geological sample testing apparatus is known wherein what may be termed a self-supporting geological sample such as a core of rock or compacted sand is subjected to external forces by what is known as a tri-axial testing cell. Whilst the term "geological" is used herein and is consistent for many applications of the cell for testing borehole samples for example, it is to be understood that the apparatus can also be used for testing manufactured materials such as concrete or artificial stone etc. One such form of cell which has been proposed comprises a pressure chamber within which the sample can be located, the sample usually being of cylindrical form and being supported at its lower end by a lower platten for example having a circular cross-section, the sizes of the chamber and sample being such that a substantial annular space surrounds the sample when situated therein. Extending through a vertical bore in the top wall of the chamber is a cylindrical ram which bears on the upper end of the geological sample to be tested via an upper platten and applies a compressive load to the sample by a downward mechanical force being applied to the ram. At the same time hydraulic fluid is introduced into the annular space of the chamber surrounding the sample to apply a hydraulic force to the exterior cylindrical surface of the sample. Normally an impermeable membrane surrounds the sample, particularly if the sample is of a permeable nature, this membrane also being arranged to enclose the sample and sealing on the upper and lower plattens to prevent hydraulic fluid gaining access to the ends of the sample.

With such apparatus various characteristics of the sample under test such as its compressive and shear strengths can be determined for example by measurements of the extent of axial movement of the ram under certain loading conditions.

Moreover, under certain conditions it may be desirable to increase the axial pressure to such an extent that the sample will disintegrate within the cell, and the axial force applied by the ram just prior to, or at the moment of disintegration can be accurately determined and useful information gained therefrom.

In order for such axial measurement of the ram to be an accurate representation of the sample characteristics in question it is found essential to control the hydraulic pressure in the annular space at a predetermined value. Bearing in mind that axial movements of the ram will vary the volume of the annular space such careful maintainance of a predetermined hydraulic pressure has been difficult to achieve in practice.

Accordingly, one particular object of the present invention is substantially to eliminate changes in the hydraulic fluid pressure in the chamber which occur during both non-disintegration measurements and also measurements at the point of failure of the sample.

According to the present invention a geological sample testing apparatus comprises a cell having a chamber within which the sample may be placed between two opposed surfaces one of which comprises or is connected to a ram extending into the chamber but leaving a space therein into which hydraulic fluid may be introduced to apply directly or indirectly a hydraulic pressure to another surface or surfaces of the sample, the ram or a part secured thereto affording at least one piston surface located within a cylinder, the surface having an effective area substantially equal to the cross-sectional area of the ram and facing in a direction such that forces applied thereto tend to increase the loading on the sample by the ram, the cylinder having an inlet positioned normally to permit free communication between the said piston surface and the said space.

In this way pressure in the cylinder and the space are substantially equalised and movement of the ram into or out of the chamber will displace hydraulic fluid between the space and the cylinder, without varying this pressure since the decrease or increase in volume of the space due to movement of the ram will instantaneously produce an inverse variation of volume of the part of the cylinder bounded by the piston.

Moreover, the hydraulic pressure acting on the piston surface augments the axial pressure applied to the ram by other normal mechanical means. This augmenting pressure is, of course, constant and, therefore, does not affect the calibration of the apparatus.

According to one specific embodiment the chamber and the cylinder are placed in communication with each other by one or more passages provided within the ram itself, for example by one or more transverse passages in the end of the ram which lies within the chamber communicating with a generally axially extending bore or bores in the ram which in turn communicate with the cylinder.

Alternatively the cylinder may be placed in communication with the same source of supply of hydraulic fluid as supplies hydraulic pressure to the chamber so that again the pressures are equalised and transfer of fluid can immediately take place by displacement of fluid out of the chamber and the drawing in of fluid into the cylinder. Thus it is not essential that the actual fluid which passes into the cylinder upon downward movement of the ram be liquid which actually leaves the chamber. So long as the chamber is placed in free communication with the cylinder the right effect will be obtained.

The invention may be carried into practice in a number of ways but one specific embodiment will now be described by way of example with reference to the accompanying drawing which illustrates in a diagrammatic manner a geological sample testing apparatus in accordance with the present invention.

This apparatus includes a base 10 to which is secured by a ring 11 a generally bell shaped geological sample testing cell 12 a portion 13 of the base extending into and being in sealing engagement with the interior of the lower end of a chamber 14 formed within the cell. Mounted centrally on the top portion 13 of the base is a lower platten 15 upon which a geological sample 16 of cylindrical form can be supported in the manner shown so as to leave an annular space 17 surrounding the sample. A transverse wall 18 of the cell forms the top of the chamber 14 and has a vertically extending bore 20 in which is mounted a reciprocable cylindrical ram 21 the lower end of which bears on an upper platten 38 resting on top of the sample 16. Above the transverse wall 18 the cell provides a cylindrical wall 22 having two coaxial bore sections 23 and 24 the latter of which is of slightly greater diameter than the former. Thus the upper bore section 24 receives a stationary sleeve 25 within which an upper portion 27 of the ram is guided. The space below the sleeve 25 and defined on its external surface by the lower bore section 23 comprises a cylinder to the upper end of which hydraulic fluid can be supplied in a manner to be described. The ram 21 has a cylindrical land 30 forming a piston in sliding engagement with the lower bore section 23. That part of the underside of the piston normally contains air and is in communication with atmosphere via a passage 32. Thus the effective cylinder is comprised by that part of the bore section 23 situated above the upper face 31 of the piston. This upper face has a cross-sectional area substantially equal to the cross-sectional area of the lower end of the ram.

The lower end of the ram, which even in its uppermost position as shown in the drawing projects slightly into the chamber within the cell 12, has a transverse passage 33 which places the interior of the chamber in communication with an axial passage 34 extending upwards through the centre of the ram, the upper end of this passage 34 being placed in communication with the cylinder space above the piston by means of a number of inclined passages 35.

In this manner a hydraulic fluid introduced via an inlet passage 37 in the base 10 and which can fill the annular space 17 surrounding the sample 16 can also pass upwards through the passages 33, 34 and 35 and apply a downward force on the piston thereby augmenting any downward load applied to the ram by other, normally mechanical, means. It will be seen that the upper end of the cylinder has a bleed passage 40 which when the system is filled with hydraulic fluid is normally closed.

Downward movement of the piston from the position shown in the drawing will bring its lower end into communication with the upper platten on the top of the sample 16 and thereafter an axial load on the sample can be applied by the ram at the same time as a hydraulic fluid pressure is applied to the cylindrical peripheral surface of the sample by the hydraulic fluid in the annular space 17. It is usually convenient to employ a cylindrical rubber diaphragm which extends completely around the sample and also is stretched over both the lower cylindrical platten 15 and the upper platten 38 in order to prevent hydraulic fluid actually contacting the surface of the sample which is, of course, essential if it is of a permeable nature.

In a typical example the axial load applied mechanically to the ram in testing say a concrete sample can be of the order of 500 tons where the cell is such a size that it can accommodate for example a concrete sample 4" in diameter and 10" in length. At the same time a hydraulic pressure within the annular space 17 of the order of 20,000 p.s.i. is applied via the inlet 37 and this pressure will of course also pass via the passages in the ram to the cylinder and be applied to the upper piston face this pressure augmenting the 500 tons axial load. In fact this augmenting pressure applies a downward force which is equal to approximately one fifth of the 500 tons load making a total downward load of the order of 600 tons.

The instrument so formed can be utilised to determine certain characteristics of the sample under test for example by relating the downward force applied by the ram on the sample to compression of the sample which can be determined by the extent of axial movement of the ram. Such axial movement of the ram will, of course, decrease the volume of the annular space 17 and so displace hydraulic fluid via the passages 33, 34 and 35 into the cylinder the volume of which, will, of course, have increased due to the downward movement of the ram. By careful equalisation of the cross-sectional area of the end of the ram and the face 31 of the piston the volume changes in the chamber and the cylinder can be made to equal one another so that no change in pressure occurs during the downward movement of the ram. In this way both the hydraulic pressure applied to the outer surface of the sample and to the face 31 of the platten will be constant during the downward movement of the ram, irrespective of the axial movement which occurs, even if this axial movement is of such an order that the compressive force applied to the sample is increased to an extent such that it disintegrates within the cell. Such disintegration would of course tend to be followed immediately by a sudden downward movement of the ram so displacing further fluid into the cylinder but again the hydraulic pressure at the point of disintegration will not be varied due to the volume and pressure equalisation obtained between the chamber and the cylinder.

What we claim as our invention and desire to secure by Letters Patent is:

1. A geological sample testing apparatus for applying mechanical and hydraulic preessure to a sample independently of each other comprising a cell having a sample chamber within which a sample is placed, conduit means communicating with said sample chamber for introducing hydraulic fluid under pressure into said sample chamber, for applying hydraulic pressure to said sample, a cylindrical bore communicating with said chamber, a ram axially slidable in said bore, said ram having an abutment face at one end for contacting a surface of the sample, the opposite end of said ram being adapted to receive mechanical pressure which is transmitted by said ram to said sample, and a piston surface on said ram intermediate the ends of said ram located within said cylindrical bore, and defining an annular chamber with said bore and said ram, said piston surface having an effective area substantially equal to the cross-sectional area of said abutment face of the ram, and further conduit means communicating between said sample chamber and said annular chamber, said abutment face and said piston surface facing in opposite directions such that movement of said ram to and away from said sample causes the volume of said annular chamber to expand and contract, whereby the hydraulic pressure applied to said sample will not be varied by the said sample chamber and said annular chamber.

2. A geological sample testing apparatus as claimed in claim 1 in which said further conduit means comprises at least one passage in said ram extending between the said sample chamber and said annular chmber.

3. A geological sample testing apparatus as claimed in claim 2 wherein said passage in said ram comprises at least one transverse passage in the ram adjacent said abutment face and at least one generally axial passage within said ram.

4. A geological sample testing apparatus as claimed in claim 1 in which the annular chamber is placed in communication with the same source of supply of hydraulic fluid as supplies hydraulic pressure to the same chamber.

References Cited

UNITED STATES PATENTS

| 1,258,855 | 3/1918 | Bayles | 95—152 |
| 1,401,003 | 12/1921 | Smith | 95—152 |
| 2,916,205 | 10/1956 | Litz | 235—61 |

FOREIGN PATENTS

| 833,581 | 10/1938 | France. |
| 571,545 | 2/1933 | Germany. |

RICHARD C. QUEISSER, Primary Examiner

J. J. WHALEN, Assistant Examiner

U.S. Cl. X.R.

78—84